3,100,174
PREPARATION OF WETTABLE POWDERS OF
2-HEPTADECYL-2-IMIDAZOLINE
Lewis F. Stevens, Haddonfield, N.J., assignor to Pittsburgh Plate Glass Company, Pittsburgh, Pa., a corporation of Pennsylvania
No Drawing. Filed July 29, 1960, Ser. No. 46,047
3 Claims. (Cl. 167—33)

This invention relates to pesticidal materials and it has particular relation to stable, wettable powders of 2-heptadecyl-2-imidazoline (also known as 2-heptadecyl glyoxalidene), having exceptionally good resistance to caking during storage.

It has heretofore been recognized that heptadecyl-2-imidazoline was a valuable pesticidal material, being effective in the control of mites and fungi such as attack apples, cherries, peaches and others. It is especially effective against cherry leaf spot and apple scab.

This material, however, is ordinarily obtained in a relatively waxy, fusible state and by conventional techniques, it is difficult to reduce it to a stable, wettable powder of a fineness adapting it for use in dusting or for dispersion in water to provide a sprayable aqueous dispersion. If an attempt were made to grind it in the presence of pulverulent diluents, it was not practicable to introduce it in high concentration without a tendency of the mixture to cohere either during milling or during subsequent storage.

The coherent material is not suitable either for dusting application or for spraying as an aqueous dispersion. Accordingly, presently the use of the material appears to be limited to solutions in appropriate organic solvents. To put into solution, 2-heptadecyl-2-imidazoline must be acidified to form 2-heptadecyl glyoxalidene acetate. The solutions can be dispersed in water to provide a water spray.

The acetate material has a certain degree of solubility in several solvents, such as isopropanol, ethanol and benzene; but even so, for commercial purposes, it is usually found desirable or necessary to limit the concentration of the acetate of 2-heptadecyl-2-imidazoline to a relatively low value, for example, in the instance of isopropanol, concentration of about 34 percent. Obviously, in this concentration, the expense of solvents is comparatively large and moreover, the bulk of material required to obtain a desired amount of the 2-heptadecyl-2-imidazoline is comparatively large. The outlay for containers is also considerable.

This invention comprises the discovery of techniques whereby 2-heptadecyl-2-imidazoline mixed with a relatively small amount of pulverulent diluent, can be converted into a fine, wettable and relatively stable powder. This powder when dispersed in water and applied as a spray, is highly effective as a pesticide.

In order to obtain 2-heptadecyl-2-imidazoline in finely pulverulent, water dispersible powder form, the following constitute the main features:

(A) The 2-heptadecyl-2-imidazoline to be converted to pulverulent form is blended with a surface active dispersing agent; namely, a monoester of polyethylene glycol and a higher fatty acid, or a monoester of said polyethylene glycol and a mixture of higher fatty acids. This agent facilitates the dispersion of the ultimate powder in water to form a spray.

(B) To the mixture to be pulverized is added a certain amount of a pulverulent, but absorptive diluent material; namely, finely pulverulent calcium silicate.

(C) The foregoing material, with or without added ingredients such as other pesticides and/or synergists, is preliminarily blended upon an appropriate apparatus to provide a mixture of intermediate particle size, which is then milled to a fine particle size, for example, to a particle size below about 5 microns, and if practicable, to even smaller particle size; usually, the finer the particle size, the better.

Preferably, the milling operation is conducted upon a so-called fluid energy vortex mill, such as a so-called Micronizer, as described in United States Patent 2,032,827. In this apparatus, the pulverulent material in suspension in a gas, is violently rotated in a vortex and the paths of the suspended particles are caused to cross each other so that many collisions occur to break up agglomerates and also further to break down individual particles.

The monoesters previously referred to as surface active agents for the pulverulent mixture are of the formula:

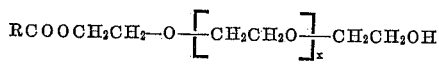

wherein R is a hydrocarbon residue of a higher fatty acid and $x$ denotes the chain length of the polyethylene glycol component and may be a number from 0 to about 60. Those esters where $x$ is below about 10 are preferred. They are formed from the corresponding alcohol

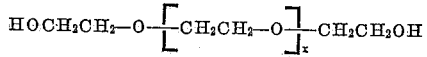

and the acid R—COOH, wherein R and $x$ have the foregoing significance.

In the formulation of a monoester of a higher fatty acid and a polyglycol, such as polyethylene glycol, useful as additives for the formation of water-dispersible powders of 2-heptadecyl-2-imidazoline, such acids as the following may be employed:

Lauric acid
Oleic acid
Stearic acid
Palmitic acid
Arachidic acid
Linoleic acid

Other fatty acids containing about 12 to 26 carbon atoms may be employed. Mixtures of these with each other or with still other higher fatty acids may be used. One economical and very satisfactory mixture of higher fatty acids is obtained by the hydrolysis of or saponification and subsequent acidification of the glycerides of cocoa butter. The resultant acid mixture is understood to be of approximately the composition:

| | Percent by weight |
|---|---|
| Palmitic acid | 24.4 |
| Stearic acid | 35.4 |
| Oleic acid | 38.1 |
| Linoleic acid | 2.1 |

Obviously, the percentages of the several acid components in the mixture vary for different source materials. The foregoing figures are merely typical and represent an approximate average value.

In many instances, these monoesters are liquids (or easily fusible to provide liquids) which can readily be blended with the 2-heptadecyl-2-imidazoline and the pulverulent filler material to provide a particulated composition adapted for milling by fluid energy as previously described.

One very satisfactory commercially available monoester of fatty acids and polyethylene glycol is sold under the trade name of Ethofat C-15. This is the monoester of cocoa fatty acids and is of an average molecular weight of about 431 and contains an average of about 5 moles of ethylene oxide per molecule of ester. It is a liquid material at ordinary temperatures. It may be replaced by fatty acid esters of diethylene glycol, triethylene glycol or others comprising two or more ethylene groups or propylene groups bridged together by oxygen.

In the formulation of 2-heptadecyl-2-imidazoline to provide a stable, wettable powder of fine particle size, the amount of the monoester is susceptible of considerable variation. For example, it may be as low as about 5 or even 3 percent by weight based upon the mixture to be ground. However, it is considered that optimum results are obtained with somewhat higher amounts, e.g., in a range of about 6 to 20 percent based upon the mixture undergoing grinding.

A pulverulent diluent is essential to the grindability of the mixture and to the maintenance of the very fine ultimate powders in uncaked state in storage over substantial periods of time. While various pulverulent diluents have been tested, calcium silicate has been found to be of outstanding merit for the purpose. The next best material has been found to be very finely divided, precipitated silica. However, the package stability of the latter is rather poor, especially when packages containing the same are not tightly sealed. The material containing pulverulent silica as an inert diluent, 2-heptadecyl-2-imidazoline as a toxicant, and a monoester of polyethylene glycol and a higher fatty acid as a dispersing agent, tends strongly to cake up upon storage and within a few weeks, packages containing the same will be damaged by such action.

While various forms of pulverulent calcium silicate may be used in the grinding of 2-heptadecyl-2-imidazoline to provide water dispersible powders, it has been determined that the commercial materials sold by the Johns-Manville Company under the trade name of Micro-Cel are excellent. This material is obtained by digesting diatomaceous earth in an autoclave with milk of lime. The product is dried and pulverized to a particle size much of which is 0.02 micron or below, and practically all of which is below a particle size of about 2 microns and the finer it is, the better. It has a specific surface of about 95 square meters per gram. It consists largely of hydrated calcium silicate. It has heretofore been used extensively as a dehumidifying agent.

Other embodiments of finely pulverulent calcium silicate may be used in place of the foregoing diatomaceous earth digested with milk of lime. The particle size may be in a range of about 0.01 to about 2 microns and the specific surface may be in a range of about 50 to 600 square meters per gram.

Several grades of this material are available. The use of any of these grades is contemplated. The properties of some of the grades which may be used are as follows:

TYPICAL PROPERTIES OF MICRO-CEL GRADES

| Micro-Cel | A | B | C | E |
|---|---|---|---|---|
| Loose weight density, lbs./cu. ft. | 7.5 | 14.5 | 7.5 | 4.5 |
| Wet density | 11.5 | 20.2 | 11.2 | 9.0 |
| Absorption, percent of weight (Gardner Coleman—paste endpoint): | | | | |
| Water | 450 | 240 | 425 | 560 |
| Oil (linseed) | 375 | 220 | 385 | 490 |
| Percent retained on 325 mesh, max. | 1.0 | 8.0 | 1.0 | 1.0 |
| Particle size, average ultimate, micron | 0.02 | 0.04 | 0.02 | 0.02 |
| pH | 9.2 | 9.2 | 10.0 | 8.3 |
| Specific resistivity, ohms | 3,000 | 3,000 | 1,500 | 2,500 |
| Brightness, TAPPI | 65 | 60 | 92 | 68 |
| Surface area, sq. meters/gram | 150 | 150 | 175 | 95 |
| Specific gravity | 2.33 | 2.20 | 2.26 | 2.45 |
| Refractive index | 1.53 | 1.52 | 1.55 | 1.55 |
| Moisture-free, percent by weight | 8.0 | 8.0 | 7.0 | 5.0 |

Additional Micro-Cel grades are available that range in absorption capacity up to 600 percent and in loose weight density as low as 3 lbs./cu.ft. These may be used as diluents in the grinding of heptadecyl-2-imidazoline in accordance with the provisions of this invention. The material sold as Micro-Cel 8-E is a useful grade of such material.

The hydrated alkaline earth metal silicates and especially the hydrated calcium silicates are useful as diluents in the grinding of heptadecyl-2-imidazoline. However, the use of powders of other insoluble hydrated silicates of divalent metals of group II of the periodic table is within the scope of the invention. One such material is sold under the trade name of Aicco-Sol and is a very finely pulverulent grade of magnesium silicate having a specific surface of about 600 square meters per gram.

The amount of pulverulent diluent which may be incorporated into the pesticidal material comprising 2-heptadecyl-2-imidazoline is susceptible of considerable variation. It may, for example, be in a range of about 3 to 50 percent by weight based upon the mixture, though the higher amounts tend substantialy to reduce the concentration of the active ingredients in the mixture.

In order to form pulverulent mixtures of intermediate particle size suitable for grinding to fine size on a vortex mill, the 2-heptadecyl-2-imidazoline and the pulverulent diluent, together with the monoester of the higher fatty acid and the polyethylene glycol, are preferably preliminarily passed through a blending apparatus, such as a cone blender, a muller, or other appropriate device. The several components are thus blended together as uniformly as possible, though but relatively little reduction of particle size is accomplished in the operation. The operation does, however, provide a powder which can readily be carried in a gas stream under pressure into a fluid energy type of mill, where the particles suspended in the gaseous medium are injected tangentially into a chamber where they form a vortex and are whirled violently and dashed together in such manner that they act upon each other to produce a grinding effect.

The grinding operation preferably is so conducted as to obtain an average particle size below about 6 microns and preferably in a range of about 2.5 to 4 microns, as determined upon a Fisher sub-sieve sizer.

The grinding operation not only reduces the particles to very small diameters, but it also effects a most thorough blending of the components of the mixture, the organic components either being coated upon the pulverulent calcium silicate, or as not at all improbable, the pulverulent calcium silicate being coated upon the particles of organic material to prevent their cohesion.

The wettable powders containing the 2-heptadecyl-2-imidazoline as their active agent and pulverulent calcium silicate as the dispersing agent are highly valuable for control of several forms of pests, as for instance, the mites such as European red mites, and also for certain fungus diseases such as cherry leaf spot and apple scab. However, for purposes of increasing the range of organisms which may be controlled by the pulverulent material, it is sometimes desirable to include added pesticidal material and/or other modifiers. Appropriate pesticidal additives include:

DDT
Malathion
Parathion
TDE (Rhothane)
Lead arsenate
Sulfur
2,3-dichloro-1,4-napthoquinone
Ferric dimethyldithiocarbamate
Dieldrin and others.

These may be used in amounts to give toxicity for the organisms against which they are used when the concentration of 2-heptadecyl-2-imidazoline is at proper level in the spray.

The following examples are illustrative of the preparation of valuable pulverulent pesticidal compositions containing large amounts of 2-heptadecyl-2-imidazoline in accordance with the provisions of the present invention.

Example I

This example is further illustrative of the use of pulverulent calcium silicate as a diluent in the grinding of 2-heptadecyl-2-imidazoline. The calcium silicate employed in this operation was the commercial material sold as Micro-Cel 8–E and having the characteristics heretofore described. The pesticidal mixture comprised:

| | Parts by weight |
|---|---|
| 2-heptadecyl-2-imidazoline | 75 |
| Pulverulent calcium silicate | 17.5 |
| Ethofat C–15 | 7.5 |

This mixture was ground upon a Micronizer mill, such as disclosed in United States Patent 2,032,827, to form a uniform blend having average particle sizes below about 5 microns. The mixture was storable in open or closed containers or bags for several months without any substantial tendency to cake or lump up, and the mixture could be readily dispersed in water to provide a spray composition. The pulverulent, wettable mixture could be carried over from one season to the next without losing its utility.

Example II

This example comprises tests comparing the stability of wettable powders containing chemically precipiated silica with materials containing very finely divided commercial calcium silicate. The silica was of an average particle size of about 0.022 micron and a surface area of about 150 square meters per gram, and comprised 87 percent of $SiO_2$ and was of a bulk density of about 10 pounds per cubic foot and a specific gravity of 1.95, and was employed as a pulverulent diluent. The silicon dioxide employed in the tests is recognized to be an excellent diluent material for organic solids in grinding operations. It also imparts good grinding properties to the waxy 2-heptadecyl-2-imidazoline. However, it has been found that packages of wettable powder of the latter material containing a high concentration of the 2- heptadecyl-2-imidazoline and the pulverulent silicon dioxide as a grinding agent, has relatively low package stability and after a comparatively short period of storage, the material tends to cake or lump up and cannot readily be dispersed in water to provide spray mixtures. The pulverulent calcium silicate used was Micro-Cel 8–E having the characteristics previously given.

In the comparative tests of storage stability between the wettable powders containing silicon dioxide as a grinding agent and those containing pulverulent calcium silicate as a grinding agent, the following test mixtures, wherein A, B and C were controls, were prepared:

TEST A

| | Parts by weight |
|---|---|
| 2-heptadecyl-2-imidazoline | 75 |
| Ethofat C–15 (dispersing agent) | 10 |
| Pulverulent silicon dioxide (as described) | 15 |

COMMENTS.—After 2½ months—lumpy. After 7½ months—further lumpiness, poor dispersion in water.

TEST B

| | Parts by weight |
|---|---|
| 2-heptadecyl-2-imidazoline | 75 |
| Ethofat C–15 | 7.5 |
| Pulverulent silicon dioxide (as described) | 17.5 |

COMMENTS.—After 2½ months—lumpy. After 7½ months—further lumpiness, poor dispersion in water.

TEST C

| | Parts by weight |
|---|---|
| 2-heptadecyl-2-imidazoline | 66 |
| Ethofat C–15 | 7.5 |
| Pulverulent silicon dioxide (as described) | 26.5 |

COMMENTS.—After 2½ months—caked. After 7½ months—further lumpiness, poor dispersion in water.

Packages of these materials after a relatively short period of storage, would not be suitable for sale.

In contrast with these materials having but poor package stability, similar formulations wherein calcium silicate (Micro-Cel 8–E) was used in place of the pulverulent silica were prepared and ground using the same techniques of blending the ingredients and grinding the mixture on a vortex mill to a particle size within the specified limits. The test compositions were as follows:

TEST D

| | Parts by weight |
|---|---|
| 2-heptadecyl-2-imidazoline | 75 |
| Ethofat C–15 | 7.5 |
| Micro-Cel 8–E | 17.5 |

COMMENTS.—After 2½ months—the material in the package was in good condition; there was little or no lumpiness. After 7½ months—there was still little or no lumpiness. The material was still useful as a commercial article.

The packages were stored in open containers and examined periodically for caking.

TEST E

| | Parts by weight |
|---|---|
| 2-heptadecyl-2-imidazoline | 66 |
| Ethofat C–15 | 7.5 |
| Micro-Cel 8–E | 26.5 |

The results of storage tests for this material were the same as in test D. The materials in which the finely pulverulent calcium silicate was used as a grinding agent were much superior as to resistance to caking in storage to the materials of tests A, B and C.

The materials of tests D and E are physically compatible with stickers and spreaders, as well as most insecticides and fungicides available. Examples of these are DDT, TDE, malathion, parathion, etc. These additives may be incorporated with the powder comprising the 2-heptadecyl-2-imidazoline before or after the latter is milled, as may be desired. The powders contain a very high percentage of the active 2-heptadecyl-2-imidazoline. When used in the amount of ⅔ pound per 100 gallons of water, they provide the equivalent of 1 quart of a 34 percent solution of 2-heptadecyl glyoxalidene acetate in a like quantity of water.

Example III

In this example, a blend including several active agents is prepared and ground on a vortex mill to form a wettable powder. The mixture comprises:

| | Percent by weight |
|---|---|
| 2-heptadecyl-2-imidazoline | 12 |
| 2,3-dichloro-1,4-naphthoquinone | 5.5 |
| Ferbam | 18.7 |
| Sulfur | 50 |
| Inerts [1] | 13.8 |

[1] Pulverulent calcium silicate.

The mixture is ground to provide a wettable powder of desired particle size. This mixture is preferably used at the rate of about 2 pounds per 100 gallons of water as a spray for controlling a range of pests attacking apples, cherries, peaches, etc.

The following illustrate comparative tests of 2-heptadecyl-2-imidazoline in the form of:

(A) A powder containing monoester of fatty acids and polyalkylene glycol and a pulverulent diluent, and being prepared as per Example II;

(B) A 34 percent solution of 2-heptadecyl glyoxalidene acetate in isopropyl alcohol.

Quantities of 2-heptadecyl-2-imidazoline and 2-heptadecyl glyoxalidene acetate solution are for mixture with 100 gallons of water.

The evaluations were made by determining the percentage of leaves of the sprayed trees which were infected.

The applications were for control of primary apple scab upon Galia Beauty trees. The spray schedule was as follows:

Delayed dormant _____ April 10
Pink _____ April 18
Petal fall _____ April 26
1st cover _____ May 10
2nd cover _____ May 21
3rd cover _____ June 4
4th cover _____ June 18
5th cover _____ July 2
6th cover _____ July 16
7th cover _____ August 1

The test data obtained are as follows.

Control:                                    Percent leaves infected
  (No spray) _____ 35
  Powder, ⅔ pound _____ 4.5
  Solution (34 percent), 1 quart _____ 5.5

The use of the pulverulent material prepared in accordance with the provisions of this invention gave an appreciable reduction in the number of leaves infected. Also, the severity of infection of the affected leaves was appreciably less in the instance of the trees sprayed with the powdered material.

Applications of the same materials in the same concentration were also conducted upon Golden Delicious trees to determine the effects of the sprays in controlling (1) bitter rot; (2) black rot; (3) Botryosphaeria rot.

The dates of application were as follows:

Delayed dormant _____ April 11
Pre-pink _____ April 17
Pink _____ April 25
Petal fall _____ May 8
1st cover _____ May 21
2nd cover _____ June 5
3rd cover _____ June 13
4th cover _____ July 2

Counts of the percentages of infected fruit were conducted after a period of 16 days from harvest time.

The spray materials were:
 (A) Control (no spray);
 (B) With 1 quart per 100 gallons of water of a 34 percent solution of 2-heptadecyl glyoxalidene acetate; and
 (C) With ⅔ pound per 100 gallons of water of powder prepared as per Example II.

The data are tabulated as follows:

| | Percent fruit infected | | |
|---|---|---|---|
| | (A) Unsprayed | (B) 34% solution (1 qt.) | (C) Powder (⅔ lb.) |
| Bitter rot | 19.3 | 11.3 | 4.2 |
| Black rot | 20.4 | 20.1 | 14.0 |
| Botryosphaeria rot | 13.7 | 10.4 | 6.4 |

In all instances, the fruit from the trees sprayed with the powder was quite superior to that sprayed with the solution of the 2-heptadecyl-2-imidazoline acetate.

The total percentages of infected apples from the different systems of treatment are as follows:

Percent fruit infected
Unsprayed _____ 53.4
Sprayed with 34 percent solution _____ 41.8
Sprayed with powder _____ 24.6

The solution spray gave only small improvement over the control.

It has further been determined that the solution spray gives substantial control of European red mites, but the powder gives an appreciably better control than solution spray, as is evidenced by the mite counts upon 260 leaf samples from trees which had been treated by the several systems.

The spray dispersions were the same as in the preceding tests and the spray schedule was as follows:

Pre-pink _____ April 18
Pink _____ April 22
Petal fall _____ May 1
1st cover _____ May 14
2nd cover _____ May 27
3rd cover _____ June 13
4th cover _____ June 21
5th cover _____ July 12
6th cover _____ August 6

The data from the counts are as follows:
                                                     Mite count
No spray _____ 8,790
Solution spray _____ 195
Powder spray _____ 95

The samples from trees which had been sprayed with a suspension of the powder gave a substantially lower count than the samples sprayed with the solution material.

In the examples of this application, part of or all of the 2-heptadecyl-2-imidazoline can be replaced by a like amount of derivatives, such as:

2-heptadecyl-1-hydroxyethylimidazoline
2-heptadecyl-2-imidazoline acetate and others.

The monoester of a higher fatty acid and polyethylene glycol employed as a surface active agent can be replaced in part or completely with an equivalent amount of the monoester of a higher fatty acid and polypropylene glycol.

*Example IV*

The wettable powders containing a high concentration of 2-heptadecylimidazoline, as herein disclosed, have been found to be substantially less phytotoxic than the conventional solutions of the 2-heptadecylimidazoline acetate, designated as glyodine. In evidence of this fact, the russeting effects upon apples of the wettable powders and a commercial 30 percent solution of the 2-heptadecylimidazoline acetate in isopropanol have been compared. In the comparison, apple trees of the Jonathan and Grimes varieties were employed.

The wettable powder employed was a commercial product prepared as herein described and being sold under the trade name of Glyoxide and comprising about 70-75 percent by weight of 2-heptadecylimidazoline ground with about 7.5 percent by weight of dispersing agent, namely Ethofat C-15, the rest of the wettable powder being pulverulent calcium silicate, namely, Micro-Cel 8-E. For a first cover application, the materials were dispersed in water, along with lead arsenate, to control codling moth and ferbam as a protective agent against the burning effects of the lead arsenate. The sprays comprised:

Wettable powder spray—
  Water _____ gallons__ 100
  Wettable powder _____ oz__ 10
  Lead arsenate _____ lbs__ 3
  Ferbam _____ lb__ ½

Glyoxin solution spray—
  Water _____ gallons__ 100
  Glyoxin _____ pints__ 2
  Lead arsenate _____ lbs__ 3
  Ferbam _____ lb__ ½

Spray applications were by conventional apparatus, the trees being sprayed until they dripped. The first cover spray was applied May 21.

Follow-up sprays comprised:

Wettable powder spray—
- Water _____ gallons__ 100
- Glyoxide _____ oz__ 5
- DDT (50 percent) _____ lbs__ 2

Glyoxin solution spray—
- Water _____ gallons__ 100
- Glyoxin solution _____ pint__ 1
- DDT (50 percent) _____ lbs__ 2

Applications of these sprays were made:

June 2
June 17
July 1

Similar sprays except for the omission of the DDT were applied July 29.

The fruit was inspected at harvest time for russeting due to the phytotoxic effects of the fungicides under comparison (Glyoxide wettable powder and Glyoxin acetate solution). The standard set was damage of sufficient severity to exclude the fruit from passing as United States No. 1 grade. The percentages of russeted fruit for each of the varieties of fruit and for each of the fungicides are tabulated as follows:

| Variety | Jonathan | Grimes | Average |
|---|---|---|---|
| Wettable powder | 11.2 | 5.6 | 8.4 |
| Glyoxin solution | 22 | 18.2 | 20.1 |

It is to be observed that the percentage of fruit damaged by russeting was much lower on the trees sprayed with wettable powders than on the trees sprayed with the solution of the 2-heptadecylimidazoline acetate.

*Example V*

This example constitutes a comparison of the injury occasioned to sour cherry fruit by sprays of wettable powders of 2-heptadecylimidazoline when prepared in accordance with this invention and sprays of the 30 percent solution in isopropanol of 2-heptadecylimidazoline acetate (Glyoxin). The sprays comprised:

- Wettable powder _____ oz__ 12
- Water _____ gallons__ 100
- Solution of Glyoxin _____ qt__ 1
- Water _____ gallons__ 100

The sprays were applied to the trees during the season; the fruit was inspected for damage by phytotoxicity of the sprays late in June.

The results are as follows:

Percentage damaged
- Wettable powder _____ 23
- Glyoxin acetate _____ 69

The damage to the fruit occasioned by the spray from the Glyoxin was far greater than that from the wettable powder.

This application is a continuation-in-part of my copending application, Serial No. 754,533, filed August 12, 1958, now abandoned.

I claim:

1. A method of forming a stable, finely divided wettable powder of 2-heptadecyl-2-imidazoline, the powder being microground and being adapted to inhibit plant pests when applied to an infected plant, which method comprises blending and microgrinding on a fluid energy vortex mill a mixture of:

(A) 2-heptadecyl-2-imidazoline;
   (B) about 3 to about 50 percent by weight based upon the mixture of a pulverulent diluent consisting essentially of a material selected from the class consisting of calcium silicate and magnesium silicate, said pulverulent diluent being of a particle size of about 0.01 to about 2 microns and of a specific surface of about 50 to about 600 square meters per gram; and
   (C) about 3 to about 20 percent by weight based upon the mixture of a monoester of the formula:

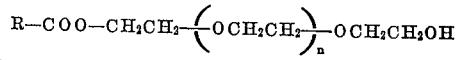

in which R is the hydrocarbon residue of a higher fatty acid and $n$ is a number from about 0 to about 60, the grinding being continued until said microground wettable powder is attained.

2. The stable, non-caking product capable of inhibiting plant pests when applied to a plant, as prepared by the method of claim 1.

3. The method of inhibiting plant pests which comprises applying to a plant subject to the pests the product as defined in claim 2.

References Cited in the file of this patent

UNITED STATES PATENTS

| | | |
|---|---|---|
| 2,529,682 | Flenner | Nov. 14, 1950 |
| 2,540,170 | Law et al. | Feb. 6, 1951 |
| 2,728,732 | Arnett et al. | Dec. 27, 1955 |
| 2,839,467 | Hutchison et al. | June 17, 1958 |